(12) United States Patent
Bach et al.

(10) Patent No.: US 8,332,119 B2
(45) Date of Patent: Dec. 11, 2012

(54) SYSTEM FOR CONTROLLING A MOTOR VEHICLE DRIVING DOWNHILL

(75) Inventors: Thomas Bach, Wolken (DE); Michael Bleser, Plaidt (DE); Elmar Hoffmann, Meinborn (DE); Stefan Wöll, Weyer (DE); Harald Thelen, Oberfell (DE)

(73) Assignee: Lucas Automotive GmbH, Koblenz (DE)

( * ) Notice: Subject to any disclaimer, the term of this patent is extended or adjusted under 35 U.S.C. 154(b) by 652 days.

(21) Appl. No.: 11/991,200

(22) PCT Filed: Aug. 21, 2006

(86) PCT No.: PCT/EP2006/008210
§ 371 (c)(1),
(2), (4) Date: Dec. 29, 2009

(87) PCT Pub. No.: WO2007/025659
PCT Pub. Date: Mar. 8, 2007

(65) Prior Publication Data
US 2010/0217469 A1 Aug. 26, 2010

(30) Foreign Application Priority Data
Aug. 30, 2005 (DE) .......................... 10 2005 041 071

(51) Int. Cl.
*B60T 8/32* (2006.01)
*G05D 1/00* (2006.01)
*G06F 7/00* (2006.01)
*G06F 17/00* (2006.01)

(52) U.S. Cl. ................ 701/93; 701/70; 701/78; 701/79; 701/83; 701/91; 303/191

(58) Field of Classification Search ................ 701/1, 70, 701/78, 79, 83, 91, 93, 96, 110, 121; 303/24.1, 303/191, 192; 188/180, 181 R, 181 A; 180/170
See application file for complete search history.

(56) References Cited

U.S. PATENT DOCUMENTS

| 5,997,108 | A | 12/1999 | Claussen et al. | |
| 6,349,253 | B1 * | 2/2002 | Bellinger | 701/53 |
| 6,915,201 | B1 | 7/2005 | Ott et al. | |
| 2001/0016795 | A1 * | 8/2001 | Bellinger | 701/53 |
| 2004/0215385 | A1 | 10/2004 | Aizawa et al. | |
| 2011/0010065 | A1 * | 1/2011 | Bach et al. | 701/70 |

FOREIGN PATENT DOCUMENTS

| DE | 196 48 559 A1 | 5/1998 |
| DE | 199 25 368 A1 | 12/2000 |

(Continued)

*Primary Examiner* — Thomas Tarcza
*Assistant Examiner* — Rami Khatib
(74) *Attorney, Agent, or Firm* — MacMillan, Sobanski & Todd, LLC

(57) ABSTRACT

A system for a hill descent control in the braking equipment of a motor vehicle comprising an electrically controllable service brake system, which is designed both for an anti-locking control function and for a braking function irrespective of actuation by the driver, a brake actuator which permits an individual adjustment of the braking pressures or braking moments generated for the individual wheels of a motor vehicle, which are the respective manipulated variables controlled by the hill descent control, an electronic control unit being provided for the electronic control and/or regulation which directly or indirectly detects variables related to operating conditions of the motor vehicle and adjusts additional braking moments when driving on steeply inclined roads, irrespective of whether a brake pedal is actuated.

20 Claims, 2 Drawing Sheets

FOREIGN PATENT DOCUMENTS

| | | |
|---|---|---|
| DE | 100 06 780 C1 | 9/2001 |
| DE | 101 01 012 A1 | 7/2002 |
| EP | 0 856 446 A2 | 8/1998 |
| WO | WO 96/11826 | 4/1996 |
| WO | WO 96/40534 | 12/1996 |
| WO | WO 01/14185 A1 | 3/2001 |

* cited by examiner

SYSTEM FOR CONTROLLING A MOTOR VEHICLE DRIVING DOWNHILL

CROSS-REFERENCE TO RELATED APPLICATIONS

This application is a National Stage of International Application No. PCT/EP2006/008210 filed Aug. 21, 2006, the disclosures of which are incorporated herein by reference in their entirety, and which claimed priority to German Patent Application No. 10 2005 041 071.5 filed Aug. 30, 2005, the disclosures of which are incorporated herein by reference in their entirety.

BACKGROUND OF THE INVENTION

The invention relates to a system for a so-called "hill descent control" (HDC) for a motor vehicle, namely a system for controlling the speed of a motor vehicle driving downhill. In such a hill descent control, the invention relates, in this case, to the aspects "actuating the hill descent control" and "feedforward control of the downhill momentum as a disturbance variable".

A hill descent control system is known from, amongst others, EP 0 856 446 B1. It is used to ensure the traction and driving stability of the motor vehicle when driving on steeply inclined roads, in particular off road. Said system is designed for a wheeled vehicle comprising a plurality of wheels, a plurality of brakes respectively intended for braking one of the wheels, an accelerator pedal, a brake pedal and a wheel lock sensor in order to detect locking of one of the wheels. A control unit has an activated state and a deactivated state. In its activated state each brake is actuated for braking the motor vehicle, when a detected motor vehicle speed is above a predetermined desired speed and no wheel locking is detected. One of the brakes is released when locking of the associated wheel is detected when the detected motor vehicle speed is above the desired speed. When entering the activated state, the control unit controls the brake such that the rate of acceleration of the motor vehicle reaches the desired speed without actuating the pedals if the motor vehicle speed is substantially less than the desired speed.

When entering the activated state, the control unit compares the motor vehicle speed with the desired speed and controls the braking means such that the motor vehicle speed approaches the desired speed. The rate of deceleration of the motor vehicle is controlled towards the desired speed when the motor vehicle speed is substantially greater than the desired speed. The rate of acceleration may be limited to a predetermined maximum value of approximately 0.2 to 0.3 g. The activated state may only be selected when the motor vehicle is in first gear or reverse gear. In the activated state, as a result of the actuation of a braking demand means of the motor vehicle by a driver, the control unit is overridden in order to increase the amount of braking above that provided by the control unit. Thus the motor vehicle is decelerated below the desired speed when no wheel locking is detected. The control unit may, in its activated state, release the brakes at least partially when the detected motor vehicle speed is below the desired speed. The control unit may be activated by a manually operable switch. The control unit actuates the brakes, if required, provided the detected motor vehicle speed is below the desired speed, in order to ensure that the rate of acceleration of the motor vehicle is less than a limit value.

In this case, the problem occurs, in particular, that soft and slippery ground conditions make driving with a motor vehicle considerably more difficult. As driving on steeply inclined roads generally takes place at low speed, a reduction and/or removal of the driving torque applied by the motor vehicle, even when the lowest gear is engaged, is insufficient on its own. Instead, additional braking moments have to be applied to the wheels.

Modern motor vehicles are generally equipped with an electrically controllable service brake system in order to enable brake functions which are independent of driver actuation, i.e. automatic brake functions, such as drive slip control (ASR) or driving dynamics control (ESP) to be carried out in addition to the anti-locking control function (ABS). To this end, the service brake system comprises a correspondingly constructed electrohydraulic control unit, an electronically controllable brake booster or is constructed as a so-called "brake-by-wire" (BBW) system. For the electronic control and/or regulation, an electronic control unit is provided which detects, via electronic sensors, variables related to operating conditions of the motor vehicle. Thus, for example, for the ABS control, the slip of the motor vehicle wheels is detected by means of wheel speed sensors, in order to control and/or to regulate the rotary behaviour of the motor vehicle wheels depending on the slip, such that locking is prevented.

WO 0114185A1 discloses a service brake system with hill descent control. A device for assisting the hill descent control detects operating conditions of the vehicle and, when driving on steeply inclined roads, adjusts additional braking moments irrespective of whether a brake pedal is actuated. The vehicle handling which results due to the adjustment of the manipulated variable, is continually detected using the vehicle speed and compared with a desired speed.

WO 9611826 discloses a service brake system with hill descent control which, when driving on steeply inclined roads, adjusts additional braking moments irrespective of whether a brake pedal is actuated, as soon as the vehicle speed exceeds a threshold value.

BRIEF SUMMARY OF THE INVENTION

As a result of the invention, the "hill descent control" (HDC) is provided as an automatic braking function in an electrically controllable service brake system, in order to adjust additional braking moments when driving on steeply inclined roads, irrespective whether the brake pedal is actuated by the driver.

As a result, the driver is not required to actuate the braking unit, so that he or she is able to concentrate in such a situation, which is often critical, on steering the motor vehicle. In this connection, sub-assemblies which are otherwise present (control computers, sensors, actuating members, drive electronics, etc) may be advantageously used at the same time. This not only keeps the complexity and the costs low. Functions which are present (for example ABS or ASR) are also available during the operation of the "hill descent control".

Other advantages of this invention will become apparent to those skilled in the art from the following detailed description of the preferred embodiments, when read in light of the accompanying drawings.

DETAILED DESCRIPTION OF THE INVENTION

Figure 1:
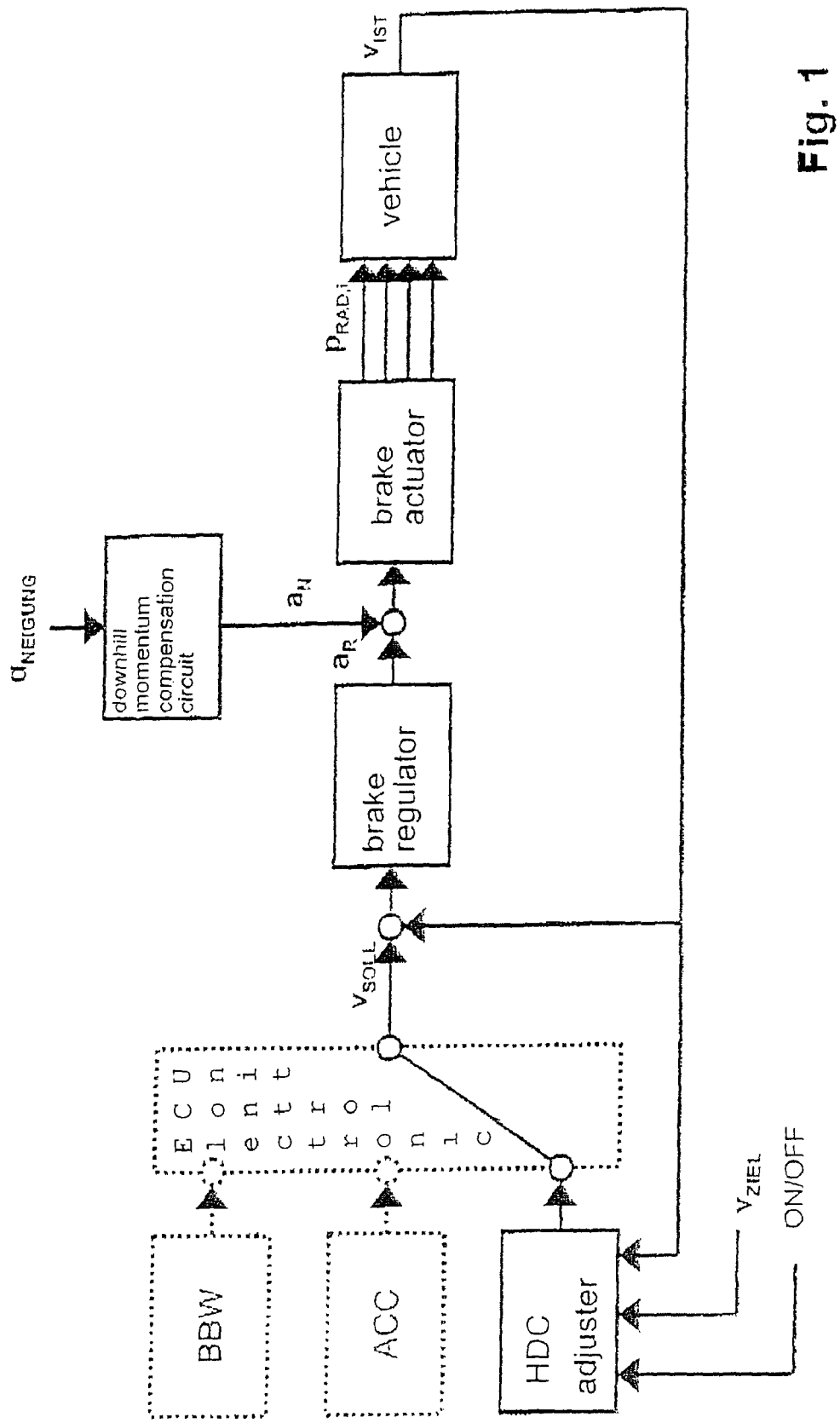
FIG. 1 is a schematic control block diagram of an electrically controllable service brake system.

For the explanation, an electrically controllable service brake system according to the invention is shown in a schematic control block diagram in FIG. 1.

A component denoted in this case as a brake actuator corresponds, for example, to an electrohydraulic control unit which permits individual adjustment of the braking pressures p_RAD,i and/or braking moments generated for the individual wheels i of a motor vehicle. In this case, the respective braking pressure p_RAD,i and/or the respective braking moment are the manipulated variables controlled by the hill descent control (HDC). The control of the motor vehicle behaviour which is produced as a result of adjusting the braking moments, is in this case continually detected using the current and/or actual motor vehicle speed v_IST which is the control variable. The control variable v_IST is compared with a desired motor vehicle speed v_SOLL, which is the reference variable. The result of this comparison is supplied to a brake regulator which controls via the brake actuator the control variable v_IST in the sense of adapting to the reference variable v_SOLL, depending on the result of the comparison. The brake actuator may to this end and in the known manner be designed as, for example, a PI regulator or PID regulator by combining proportional and/or integral and/or differential components.

In order to select which function is to be carried out by the electrically controllable service brake system, an electronic control unit may be arranged upstream of the actual control circuit which, using the driver's wishes, operating conditions of the motor vehicle, etc. gives priority to a specific function, in order to provide the respective reference variable v_SOLL thereof to the control circuit.

Such a function may, for example, be a speed regulator denoted as "adaptive cruise control" (ACC) which, relative to the conventional speed regulator known as a cruise controller, does not simply maintain a desired speed predetermined by the driver but also maintains a distance from a motor vehicle driving ahead, depending on the speed of the individual motor vehicle by, amongst others, automatic braking.

Moreover, such a function may, for example, be the braking demand of the driver, which results from the actuation of the brake pedal, firstly in order to communicate a braking demand in the case of a BBW unit, secondly in order to decide whether automatic HDC which is in operation may be interrupted in favour of conventional braking controlled by the driver.

The invention further relates to the problem of uncomfortable motor vehicle handling which is more apparent, in particular, the greater the deviation of the control variable v_IST and the reference variable v_SOLL from one another when input into the HDC. This may be overcome in terms of control engineering, namely by a suitable design of the brake regulator. However, this might be in conflict with the goal of using a common control structure for various other braking functions (ABS, ASR, etc.—see above).

Therefore, as shown in FIG. 1, an HDC adjuster is proposed which adapts the reference variable v_SOLL depending on a target variable v_ZIEL, an ON/OFF signal and the control variable v_IST.

The target variable v_ZIEL is a desired speed, at which the hill descent is intended to take place within the scope of HDC. In this connection, it may be either a constant variable which is predefined in the system, for example v_ZIEL=8 km/h, or a variable which may be selected by the driver by means of an operating element, for example a potentiometer, within a range for example of 5 km/h<v_ZIEL<20 km/h. If the motor vehicle is equipped with a cruise controller or with ACC, it may be provided to adjust the target variable v_ZIEL by means of the operating element present for this purpose. A further possibility of varying the target variable v_ZIEL by the driver is to increase the target variable v_ZIEL by actuating the accelerator pedal and to reduce the target variable v_ZIEL by actuating the brake pedal. Finally, it is also possible to vary the target variable v_ZIEL depending on the incline of the road currently driven on and, more specifically, the steeper the incline, the lower the desired speed and/or vice versa.

The ON/OFF signal is generated by an operating element, for example a switch, via which the driver initially communicates to the system the desire to activate HDC. If in a first step there is a desire to activate HDC, in a second step an activation of HDC is, therefore, monitored for plausibility. Specific criteria are used for this monitoring, using operating conditions of the motor vehicle, including:

Is the current motor vehicle speed below a low speed (for example v_IST<30 km/h)?

Is the lowest gear (for example first gear) engaged?

Is the motor vehicle not driving uphill?

If the monitoring is completed in the affirmative, in a third step the reference variable v_SOLL is adapted to the target variable v_ZIEL.

Figure 2:
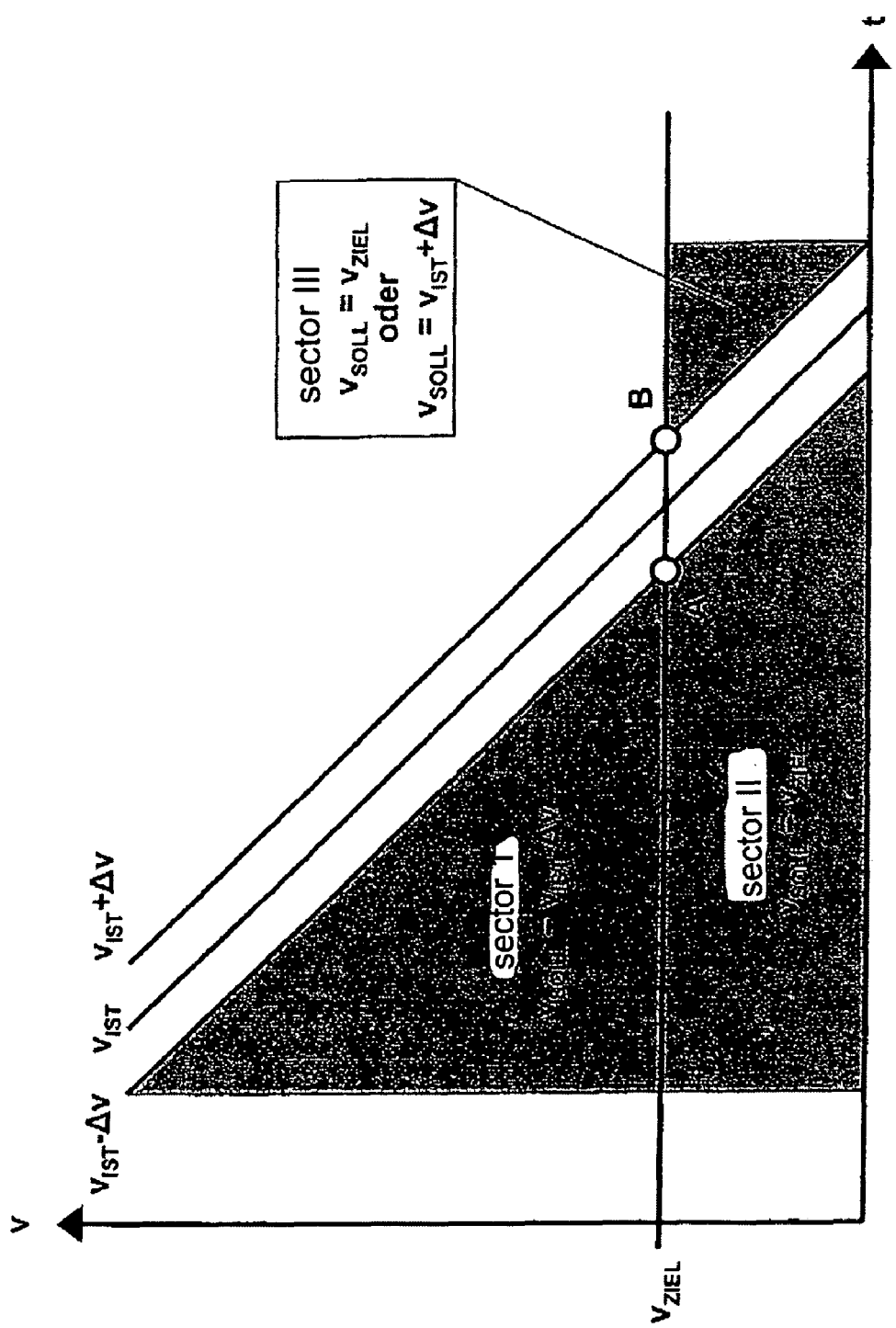
FIG. 2 is a speed-time diagram.

A preferred embodiment of how the reference variable v_SOLL may be adapted or brought closer to the target variable v_ZIEL, is shown in the speed-time diagram according to FIG. 2.

At the same time, the adaptation takes place depending on the control variable v_IST, to which an offset $\Delta v$ is applied in the negative and positive direction. The resulting paths v_IST−$\Delta v$ and v_IST+$\Delta v$, depending on the time, intersect the path of the constant target variable v_ZIEL at points A and B. As a result, sectors I, II and III are determined, for which the reference variable v_SOLL is respectively set as follows:

Sector I is determined by the condition:
v_IST−$\Delta v$>v_ZIEL

If this is fulfilled, the following applies:
v_SOLL:=v_IST−$\Delta v$

As a result, the reference variable v_SOLL is brought closer to the target variable v_ZIEL in a uniform manner depending on the control variable v_IST, so that particularly when input into the HDC, the motor vehicle handles very comfortably.

Sector II is determined by the condition:
v_IST−$\Delta v$<=v_ZIEL

If this is fulfilled, the following applies:
v_SOLL:=v_ZIEL

This means that as soon as the control variable v_IST, minus the offset $\Delta v$, reaches the target variable v_ZIEL or falls below the target variable v_ZIEL, the target variable v_ZIEL is immediately accepted as a reference variable v_SOLL in order to achieve dynamic control behaviour.

Sector III is determined by the condition:
v_IST+$\Delta v$>=v_ZIEL

If this is fulfilled, either the following applies: v_SOLL:=v_ZIEL or: v_SOLL:=v_IST+$\Delta v$ In this case, either, as with sector II, the target variable v_ZIEL is immediately accepted as a reference variable v_SOLL, or when less dynamic control behaviour is desired, the reference variable v_SOLL is brought closer to the target dynamic control behaviour may, for example, be desired when, towards the end of a hill descent, with a reducing incline of the road, the effect of the downhill force is reduced, whereby the actual motor vehicle speed v_IST may briefly fall.

As an alternative, the offset $\Delta v$ may, instead, be dynamically varied as a constant depending on the control variable v_IST, in the sense that it becomes greater when the control variable v_IST increases, so that no straight lines would be produced for the paths v_IST−$\Delta v$ and v_IST+$\Delta v$, as shown in FIG. 2, but envelope curves would be produced. As a result it might be achieved that the reference variable v_SOLL in sector I is brought closer to the target variable v_ZIEL more rapidly. This is, in particular, advantageous if, when input into the HDC, the control variable v_IST is markedly above the target variable v_ZIEL (i.e. more than a predetermined value).

Moreover, the invention relates to the effect of the downhill force on the HDC which may be very high when driving on steeply inclined roads.

In principle, the effect of the downhill force is compensated by the brake regulator, as the control variable is the current and/or actual motor vehicle speed v_IST at which the motor vehicle moves forward. However, fluctuations or sudden alterations to the inclination angle, as may occur for example when driving into and out of the slope, lead to overshoot and/or undershoot in the time response of the control variable v_IST, which the driver senses as very unpleasant due to the resulting acceleration and/or deceleration phases which occur. This problem may be solved in terms of control engineering by means of a suitable design of brake regulator, for example as an adaptive regulator. However, this might lead to a conflict, as also already explained above, with the goal of using a common control structure for different braking functions.

A downhill momentum compensation circuit, as shown in FIG. 1, is used to solve this problem. The downhill momentum compensation circuit superimposes a corrective signal a_N, which is determined, according to the current incline and/or actual incline of the slope a_NEIGUNG which is driven on, by the downhill momentum compensation circuit, onto the output signal of the brake regulator a_R. As a result of the feedback of the incline a_NEIGUNG to the output of the brake regulator, the effect thereof on the control circuit is almost completely compensated, so that there is no negative effect on the dynamic behaviour of the brake regulator to any great extent. The brake regulator responsible for the quality of the control, therefore, only needs to be designed for the simple case of the motor vehicle being moved on the flat. As a result, in addition to the advantages in terms of control engineering, the complexity and costs of the required apparatus (computer capacity/memory capacity, etc.) may also be kept low. A further advantage is that the downhill momentum compensation circuit according to the invention may also be used by other functions, such as for example ACC.

The incline a_NEIGUNG is ideally detected by means of suitable sensor means (for example an inclinometer) based on measuring techniques and supplied to the downhill momentum compensation circuit as an input variable. If the motor vehicle uses sensor means to detect the overall longitudinal acceleration of the motor vehicle, the incline may also be detected, by the longitudinal acceleration of the motor vehicle detected from the signals of the wheel speed sensors being subtracted from the overall longitudinal acceleration of the motor vehicle.

The downhill momentum compensation circuit detects the corrective signal a_N, on the basis of the incline a_NEIGUNG by using motor vehicle parameters (for example weight) as well as operating conditions of the motor vehicle (for example loading state).

If the output signal of the brake regulator a_R is measured as deceleration, the corrective signal a_N is also measured as deceleration, as a result of which the deceleration requested by the brake actuator is increased with an increasing incline a_NEIGUNG.

The value of the incline a_NEIGUNG may vary between approximately +45° and approximately −45°.

In summary, the following fundamental principles and advantages of the system according to the invention may be cited:

- the desired value for the speed control in HDC mode according to the invention is a function of the current motor vehicle speed, the (variable) target speed, and a dynamically altering maximum difference between the desired speed and the current motor vehicle speed.
- abrupt control action during the HDC mode according to the invention is avoided; thus resulting in more comfortable vehicle handling.
- the current motor vehicle speed is taken into account when determining the desired value according to the invention; this results in drive handling which is perceived as natural.
- the desired speed is determined according to the invention depending on the motor vehicle speed, provided that the target speed is not within a limit range.
- The system according to the invention also operates at variable target speeds
- the downhill momentum compensation circuit according to the invention permits the use of conventional control structures and control algorithms, which are based on the fact that the motor vehicle moves on substantially flat ground. In this connection, the downhill force and/or downhill acceleration are detected and supplied to the control circuit as disturbance variables. This leads to a simple control algorithm and to a shorter reaction time of the controller in the event of alterations to the incline/gradient.

In conclusion, it might be noted that the invention may be implemented as software on the computer unit of the electronic control unit of the brake equipment, which is otherwise present, so that additional costs for hardware do not arise.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A system for a hill descent control HDC in the braking equipment of a motor vehicle comprising;
    an electrically controllable service brake system that includes a brake regulator configured to provide an output signal a_R;
    a brake actuator connected to the brake regulator and that receives the brake regulator output signal, the brake actuator permitting individual adjustment of at least one of braking pressures p_RAD,i and braking moments generated for individual wheels (i) of a motor vehicle, which are respective manipulated variables controlled by the hill descent control HDC, with the control of the motor vehicle behaviour which is produced as a result of adjusting a manipulated variable being continually detected using a current motor vehicle speed v_IST, which is used as a control variable, the control variable v_IST being compared with a desired motor vehicle speed v_SOLL, which is used as a reference variable;
    an electronic control unit which directly or indirectly detects variables related to operating conditions of the motor vehicle and adjusts additional braking moments when driving on steeply inclined roads;
    a downhill momentum compensation circuit which superimposes a corrective signal a_N, which is determined according to at least one of (i) a current incline and (ii) an actual incline a_NEIGUNG of a slope which is driven on, onto the output signal of the brake regulator a_R; and an HDC adjuster which adapts the reference variable v_SOLL depending on a target variable v_ZIEL and the control variable v_IST, where the reference variable v_SOLL is selected in accordance with one of the following ranges:

a first range v_IST-Δv>v_ZIEL, the following applies: v_SOLL:=v_IST-Δv, where Δv is an offset and whereby the reference variable v_SOLL is brought closer to the target variable v_ZIEL in a uniform manner depending on the control variable v_IST;

a second range v_IST-Δv<=v_ZIEL, the following applies: v_SOLL:=v_ZIEL, whereby, as soon as the control variable v_IST, minus the offset Δv, reaches the target variable v_ZIEL or falls below the target variable v_ZIEL, the target variable v_ZIEL is immediately accepted as a reference variable v_SOLL; and a third range v_IST<=v_ZIEL-Δv, the following applies: v_SOLL:=v_ZIEL or v_SOLL:=v_IST+Δv, whereby either the target variable v_ZIEL is immediately accepted as a reference variable v_SOLL or the reference variable v_SOLL is brought closer to the target variable v_ZIEL in a uniform manner depending on the control variable v_IST, with the offset Δv being dynamically varied depending on the control variable v_IST such that it becomes greater when the control variable v_IST increases.

2. The system according to claim 1, wherein the HDC adjuster adapts the reference variable v_SOLL in accordance with an ON/OFF signal.

3. The system according to claim 2, wherein the electronic control unit adjusts braking moments, irrespective of whether a brake pedal is actuated.

4. The system according to claim 3, wherein the electrically controllable service brake system provides both for an anti-locking control function ABS and for a braking function such as drive slip control ASR or driving dynamics control ESP, irrespective of driver actuation.

5. The system according to claim 4, wherein a result of the comparison of the control variable with the reference variable is supplied to the brake regulator which controls via the brake actuator the control variable v_IST in the sense of adapting to the reference variable v_SOLL, depending on the result of the comparison.

6. The system according to claim 5, wherein the brake regulator is designed as one of a P regulator, a PI regulator and a PID regulator by combining, as appropriate, selected ones of proportional, integral, and differential components.

7. The system according to claim 6, wherein the electronic control unit is arranged upstream of the brake regulator which, using at least one of external and internal variables, such as the driver's wishes, operating conditions of the motor vehicle, gives priority to a specific function in order to provide the respective reference variable v_SOLL thereof to the control circuit.

8. The system according to claim 7, wherein the specific function is a speed regulator such as an adaptive cruise control ACC which maintains a desired speed predetermined by the driver, and maintains a distance from a motor vehicle driving ahead depending on the speed of the individual motor vehicle, by automatic braking.

9. The system according to claim 7, wherein the specific function is a braking demand of the driver, which results from the actuation of the brake pedal, in order to communicate a braking demand in the case of a brake-by-wire BBW unit, and in order to decide whether automatic HDC which is in operation may be interrupted in favour of conventional braking controlled by the driver.

10. The system according to claim 7, wherein at least one of an electrohydraulic control unit, an electronically controllable brake booster and brake-by-wire equipment is provided as the brake actuator.

11. The system according to claim 2, wherein an ON/OFF signal, in a first step, communicates to the system, by means of an operating element, the desire of the driver to activate a HDC operational mode.

12. The system according to claim 11, wherein in a second step, before the activation of the HDC operational mode, the activation of the HDC operational mode is monitored for plausibility.

13. The system according to claim 12, wherein for plausibility monitoring, specific criteria derived from operating conditions of the motor vehicle are monitored.

14. The system according to claim 13, wherein at least one of the following operating conditions of the motor vehicle are monitored:
(i) the current motor vehicle speed is below a low speed;
(ii) a low gear is engaged;
(iii) the motor vehicle is not driving uphill.

15. The system according to claim 14, wherein in the case of a positive result to the plausibility monitoring, in a third step the reference variable v_SOLL is adapted to the target variable v_ZIEL.

16. The system according to claim 1, wherein the target variable v_ZIEL is a desired speed at which the hill descent is intended to take place in HDC mode.

17. The system according to claim 16, wherein the desired speed v_SOLL is one of a predefined constant variable and a variable which may be selected by the driver by means of an operating element within a range.

18. The system according to claim 17, wherein the desired speed v_SOLL may be adjusted by means of a cruise control operating element present in the motor vehicle.

19. The system according to claim 17, wherein the desired v_SOLL speed may be increased by the driver by means of actuating the accelerator pedal and reduced by the driver by means of actuating the brake pedal.

20. The system according to claim 1, wherein the desired speed v_SOLL may be varied depending on the incline of the road currently driven on, a steeper incline resulting in a lower desired speed and vice-versa.

* * * * *